United States Patent [19]  [11] 4,146,476
Spiewok  [45] Mar. 27, 1979

[54] PEELING CENTRIFUGE

[75] Inventor: Leonhard Spiewok, Wallisellen, Switzerland

[73] Assignee: Escher Wyss Limited, Zurich, Switzerland

[21] Appl. No.: 877,713

[22] Filed: Feb. 14, 1978

[30] Foreign Application Priority Data

Feb. 22, 1977 [CH] Switzerland ............ 02179/77

[51] Int. Cl.² .................................. B01D 23/24
[52] U.S. Cl. ........................... 210/82; 210/108; 210/333 R; 210/373; 210/393
[58] Field of Search ............... 233/19 R; 210/78, 104, 210/333 R, 360 R, 369, 371, 372–376, 395, 397, 79, 81, 82, 108, 393, 121, 67, 108, 393

[56] References Cited
U.S. PATENT DOCUMENTS

| 1,761,593 | 6/1930 | Sharples | 210/66 |
| 2,172,320 | 9/1939 | Jones | 210/78 |
| 2,658,620 | 11/1953 | Davis et al. | 210/372 |

Primary Examiner—Frank Sever
Attorney, Agent, or Firm—Robert A. Ostmann

[57] ABSTRACT

In a peeling centrifuge comprising a rotatable centrifuging drum which is surrounded by a stationary filtrate collection chamber having an outlet, and wherein the drum perforations communicate directly with that chamber, regeneration of the filter bed is effected while the drum rotates by throttling said outlet and introducing liquid to the chamber, so that liquid accumulates in the chamber and penetrates, at any instant, at least a portion of the filter bed. In one embodiment, wherein the drum axis is horizontal, only a sector of the bed in the lower region of the drum is penetrated at any time, and regeneration of the entire bed is accomplished sequentially as the drum rotates. In other embodiments, the chamber is allowed to fill with regenerating liquid to such extent that the entire bed is penetrated simultaneously. The regeneration technique may be carried out either in the terminal phase of a centrifuging operation, or after completion of centrifuging and peeling of the accumulated solids cake.

18 Claims, 8 Drawing Figures

PEELING CENTRIFUGE

BACKGROUND OF THE INVENTION

The invention relates to a method and apparatus for regenerating the filter bed of a peeling centrifuge comprising a rotatable centrifuging drum which is surrounded by a stationary filtrate collection chamber.

The filter bed of a peeling centrifuge is formed substantially of a filter cloth, and the residue layer which cannot be further husked or peeled and which is left on the filter cloth after the peeling operation. Very fine solid particles remain suspended in the filter bed, and the number of these particles increases from batch to batch until the bed becomes blocked. At that point, the bed must be regenerated.

A known technique for regenerating the filter bed involves the use of a washing liquid which is introduced into the interior of the drum. This proposal, however, is effective only in cases where the solids are soluble in the liquid. In cases where the solids are insoluble, regeneration may be accomplished by stopping the drum and chiseling out the solids layer. Alternatively, the drum may be enveloped by the integral, siphon-like trough suggested in U.S. Pat. No. 1,761,593, granted June 3, 1930, which can be used to bring about an inwardly directed flow of liquid through the bed as the drum rotates. However, the first of these techniques entails obvious inconveniences, and the second involves undesirable complexities.

SUMMARY OF THE INVENTION

The object of this invention is to provide an improved method and apparatus for regenerating the filter bed of a peeling centrifuge which accomplishes the desired task in a relatively simple manner and while the drum is in motion. According to the improved technique, the outlet from the filtrate collection chamber is throttled while liquid is introduced to that chamber to thereby accumulate in the chamber a body of liquid of sufficient volume to cause some of the liquid to penetrate, at any instant of time, through at least a portion of the filter bed. This backflow through the bed dislodges the solid residue, and thus effects the desired regeneration.

In cases where the drum axis is horizontal, it is sufficient that only a sector of the filter bed in the lower region of the drum at any time be penetrated, since penetration, and consequently regeneration, of the entire bed will be effected sequentially as a result of drum rotation. On the other hand, in cases where the centrifuge has a vertical axis, the volume of liquid accumulated in the collection chamber is such that the entire filter bed is penetrated simultaneously. This alternative procedure, of course, may also be used with machines having a horizontal axis. The required level of liquid in the collection chamber may be controlled in various ways. One scheme uses a liquid overflow which leads directly from the chamber. Others involve sensing the actual liquid level either in the drum or in that portion of the chamber outside the drum, and using the sensed data to control the flow of liquid into or out of the chamber.

The method may be associated with the centrifuging operation in either of two ways. According to one embodiment, the outlet from the collection chamber is throttled during a terminal phase of the centrifuging operation, so that the liquid which accumulates in the chamber, and which is used to effect regeneration, is the filtrate separated from the solids during that terminal phase. In this case, peeling takes place after regeneration and, therefore, the residue flushed from the filter bed is removed from the drum along with the caked solids. In the second embodiment, regeneration is effected after centrifuging is complete and the solids cake has been peeled from the drum. The regeneration liquid in this version may be introduced by a conduit leading directly into the collection chamber or by a wash conduit which opens into the drum, and thus delivers liquid to the chamber via the drum perforations.

BRIEF DESCRIPTION OF THE DRAWING

Several embodiments of the invention are described herein with reference to the accompanying drawing, which shows the apparatus in simplified manner and in which.

DESCRIPTION OF ILLUSTRATED EMBODIMENTS

Figure 1:
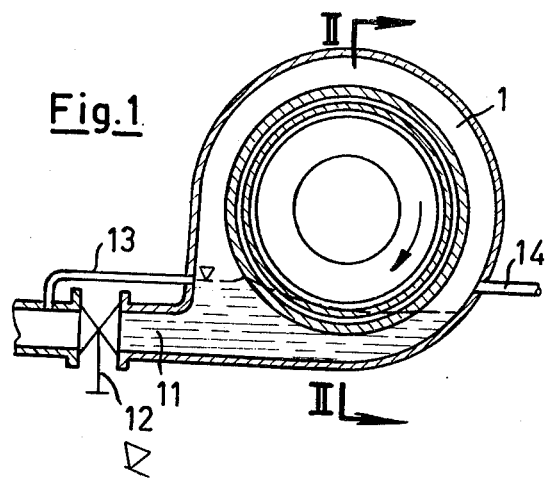
FIG. 1 is a cross sectional view through the drum and filtrate chamber of one peeling centrifuge.
Figure 2:
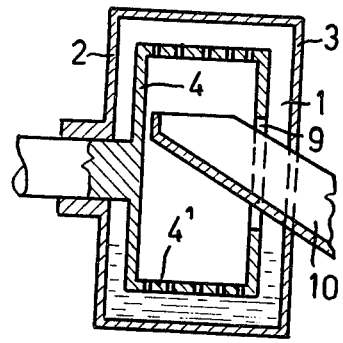
FIG. 2 is a sectional view taken on line II—II of FIG. 1.
Figure 3:
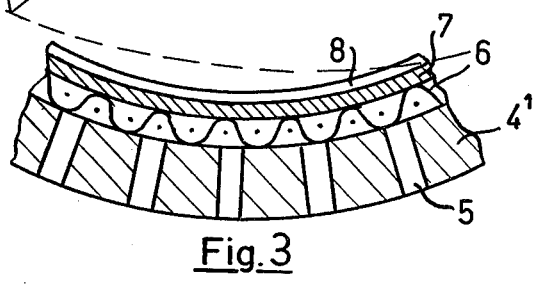
FIG. 3 is an enlargement of a portion of FIG. 1.

The peeling centrifuge shown in FIGS. 1-3 comprises a stationary filtrate collection chamber 1 which is bounded by a housing 2 provided with a cover 3, and which contains a centrifuging drum 4 which rotates about a horizontal axis. Drum 4 includes a shell $4^1$ containing liquid apertures 5, and, at its internal side, the shell is equipped with a wire mesh fabric 6 which supports a filter cloth 7. A layer of solids which cannot be peeled or husked further, i.e., a residue layer 8, lies on the filter cloth 7.

Centrifuging drum 4 is provided a central aperture 9 which accommodates the peeling mechanism (not shown) and through which the mixture to be filtered is introduced and the separated solid substances are discharged. A discharge channel 10 for the solids is shown in FIG. 2. The filtrate collection chamber 1 is equipped with an outlet duct 11 containing a shutoff device 12, and with an overflow conduit 13.

The filter bed 7, 8 may be regenerated during the terminal phase of a centrifuging operation simply by closing shutoff device 12, and thereby causing the filtrate issuing from drum 4 to accumulate in chamber 1 and rise to a level at which the liquid penetrates at least a sector of the bed which, at any moment, is at the lower region of the drum. Suitable penetration is indicated by the liquid level shown in FIG. 3. Since the drum is rotating, the entire bed is penetrated sequentially, sector-by-sector. This penetration by the regenerating liquid lifts the residue solids from the bed and allows them to be removed from the drum with the caked solids during a subsequent peeling operation.

Regeneration of bed 7, 8 may also be carried out after the centrifuging operation is complete and the caked solids have been peeled. In this case, the regenerating liquid, which may be filtrate from the centrifuging operation, is introduced to chamber 1 through inlet pipe 14. As in the previous case, drum 4 is kept in motion and outlet 11 is throttled by shutoff device 12. The residue lifted from the bed may be removed immediately from the interior of the drum, or it may be retained in the drum and comingled with the next charge of the mixture which is to be centrifuged.

Figure 1A:
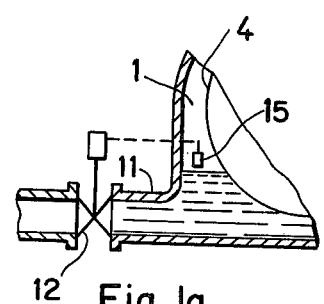
FIG. 1a is a partial cross sectional view similar to FIG. 1 showing an alternative liquid level control scheme.

Overflow 13 limits the height of the liquid in chamber 1 during regeneration, and naturally it is located at an elevation which insures the desired degree of penetration of bed 7, 8. As indicated in FIG. 1a, such liquid level control may also be accomplished using a device 15 which is located to sense the level of the liquid in chamber 1, and which is connected to regulate the throttling action of shutoff device 12 so as to maintain that level at the desired elevation during regeneration. The liquid level in the portion of chamber 1 outside drum 4 will be at a higher elevation than the liquid level within the drum. The spacing between these two levels depends upon the inflow resistance of the drum, which, of course, is determined by the ventilation effect of the rotating drum and the flow resistance of the filter bed.

Figure 4:
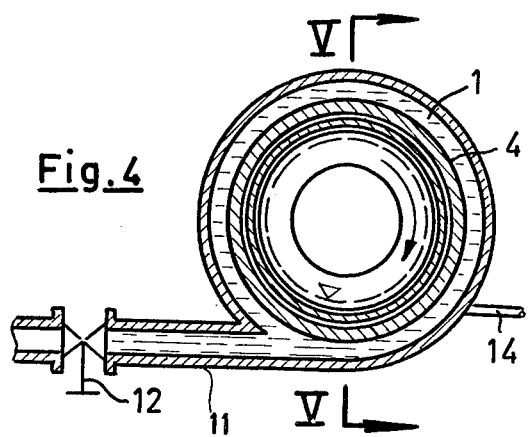
FIG. 4 is a cross sectional view through the drum and filtrate chamber of a second peeling centrifuge.
Figure 5:
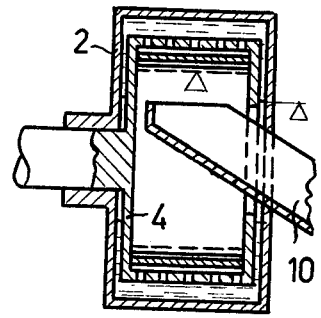
FIG. 5 is a sectional view taken on line V—V of FIG. 4.
Figure 6:
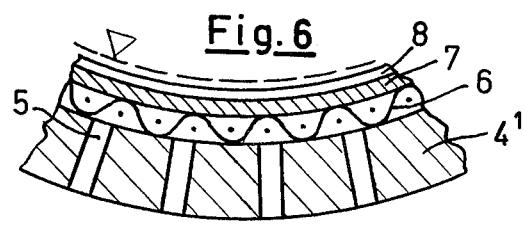
FIG. 6 is an enlargement of a portion of FIG. 5.
Figure 4A:
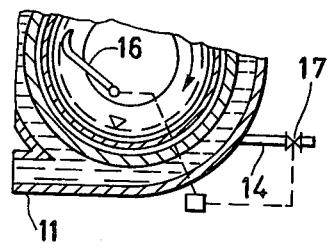
FIG. 4a is a partial cross sectional view similar to FIG. 4 showing another liquid level control scheme.

In the embodiment depicted in FIGS. 4–6, the flows of liquid into and out of chamber 1 are so correlated that, as the drum 4 rotates, a ring of liquid surrounds the drum. Thus, in contrast to the first embodiment, the entire circumference of the filter bed is penetrated simultaneously. The liquid situated in the two annular gaps between the end walls of housing 2 and drum 4 balances the liquid forced through the filter bed, thereby forming the liquid levels indicated by triangles in FIG. 5. As shown in FIG. 4a, the desired height of the liquid level within drum 4 may be maintained automatically by a level sensor 16 which is located within the drum and is connected to regulate the throttling action of a shutoff device 17 located in liquid inlet conduit 14. Alternatively, sensor 16 may control the shutoff device 12 in outlet conduit 11, or it may control both of the shutoff devices 12 and 17. A suitable level sensor 16 is the known lever mounted shoe type sensor presently being used to detect the level of the mixture introduced to the drum and to signal completion of the filling phase of the centrifuging operation.

I claim:

1. A method of regenerating the filter bed of a peeling centrifuge which comprises a rotatable centrifuging drum which contains the filter bed and is surrounded by a stationary filtrate collection chamber having a liquid outlet, and wherein the drum has liquid path means between its interior and said chamber consisting of perforations in the drum, the method comprising the steps of rotating the drum; throttling said outlet; and introducing liquid to said chamber so that there accumulates in the chamber a body of liquid of sufficient volume to cause some of the liquid to penetrate through the entire depth of at least a portion of the filter bed to thereby regenerate the bed.

2. A method as defined in claim 1 in which the drum rotates about a horizontal axis; and the throttling and liquid-introducing steps are so correlated that the liquid which accumulates in said chamber penetrates, at any instant, only a sector of the filter bed in the lower region of the drum, whereby penetration of the entire filter bed is accomplished sequentially, sector-by-sector as the drum rotates.

3. A method as defined in claim 1 in which the throttling and liquid-introducing steps are so correlated that the accumulated liquid fills said chamber to such extent that it penetrates the entire filter bed simultaneously as the drum rotates.

4. A method as defined in claim 1 in which said body of liquid is formed from liquid introduced directly into the chamber.

5. A method as defined in claim 1 in which said body of liquid is formed from liquid introduced into the chamber through the drum perforations.

6. A method as defined in claim 1 wherein said throttling and liquid-introducing steps are performed after completion of a centrifuging operation in which the liquid component of a mixture is separated from a solids component and passes through the drum perforations into said chamber, the solids component forms a cake on the drum, and that cake is peeled from the drum.

7. A method as defined in claim 1 wherein said throttling and liquid-introducing steps are performed during a terminal phase of a centrifuging operation in which the liquid component of a mixture is separated from a solids component and passes through the drum perforations into said chamber, and the solids component form a cake on the drum, whereby the filtrate which is separated from the solids component is the liquid which accumulates in said chamber and regenerates the filter bed; and wherein the solids cake is peeled from the drum after the filter bed has been penetrated by the liquid accumulated in said chamber.

8. A method as defined in claim 1 including the step of establishing a limiting level for the liquid which accumulates in said chamber by allowing liquid to overflow from that chamber at a predetermined elevation.

9. A method as defined in claim 1 including the step of establishing a limiting level for the liquid which accumulates in said chamber by sensing the liquid level and controlling at least one of said throttling and introducing steps in accordance with the sensed height of said level.

10. A method as defined in claim 9 in which the liquid level inside the drum is sensed.

11. A method as defined in claim 9 in which the liquid level in the chamber outside the drum is sensed.

12. In a peeling centrifuge comprising a rotatable centrifuging drum containing a filter bed and which is surrounded by a stationary filtrate collection chamber having a liquid outlet conduit, the improvement which comprises the combination of liquid path means between the interior of the drum and said chamber consisting of perforations in the drum; means for introducing liquid into said chamber; and a regulatable shutoff device for throttling flow through said outlet conduit, whereby said combination serves to regenerate said filter bed by accumulating in said chamber a body of liquid of sufficient volume to cause some of the liquid to penetrate through said bed.

13. A peeling centrifuge as defined in claim 12 in which said means for introducing liquid comprises a liquid inlet conduit which opens into said chamber.

14. A peeling centrifuge as defined in claim 13 including control means for controlling flow through at least one of said liquid inlet and outlet conduits in dependence upon a liquid level within said chamber.

15. A peeling centrifuge as defined in claim 14 in which the control means includes means for sensing a liquid level within the drum.

16. A peeling centrifuge as defined in claim 14 in which the control means includes means for sensing a liquid level in the chamber outside the drum.

17. A peeling centrifuge as defined in claim 12 which includes a liquid overflow leading from said chamber at a predetermined elevation thereof.

18. A peeling centrifuge as defined in claim 12 which includes control means for controlling the shutoff device in dependence upon the height of a liquid level within said chamber.

* * * * *